(12) United States Patent
DeVolpi

(10) Patent No.: US 6,236,034 B1
(45) Date of Patent: *May 22, 2001

(54) POINTING DEVICE HAVING SEGMENT RESISTOR SUBTRATE

(75) Inventor: Dean R. DeVolpi, Sparks, NV (US)

(73) Assignee: VaraTouch Technology Incorporated, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/141,717

(22) Filed: Aug. 28, 1998

(51) Int. Cl.[7] ........................................... G06M 7/00
(52) U.S. Cl. ........................... 250/221; 338/68; 338/54; 200/6 A
(58) Field of Search .................... 250/221; 338/68, 338/154, 128, 118, 167, 196; 200/6 A

(56) References Cited

U.S. PATENT DOCUMENTS

| | | | |
|---|---|---|---|
| 4,352,084 | * 9/1982 | Graves et al. | 338/127 |
| 4,511,769 | * 4/1985 | Sahakian et al. | 200/6 A |
| 4,864,272 | * 9/1989 | Cecchi et al. | 338/128 |
| 5,675,309 | 10/1997 | DeVolpi | 338/68 |
| 5,912,612 | * 6/1999 | DeVolpi | 338/95 |
| 5,949,325 | * 9/1999 | DeVolpi | 338/154 |

OTHER PUBLICATIONS

U.S. application No. 08/939,377, Allan E. Schrun, et al., filed Sep. 29, 1997.

* cited by examiner

Primary Examiner—Que T. Le
Assistant Examiner—Thanh X. Luu
(74) Attorney, Agent, or Firm—Townsend and Townsend and Crew LLP

(57) ABSTRACT

A pointing device comprises a substrate having a fixed pivoting hole area defined by a hole through a conductive surface that is coated with electrically conductive material and comprises four segments of patterned resistive materials. Each segment includes a plurality of spaced thick film pieces that may include radially extending strips, substantially Rectangular blocks, or substantially circular pieces. An electrically conductive force disc is supported by is a movable conductive spring or sheath to pivot relative to the pivoting hole area and rotate over the resistive surface of the substrate. The deflection of the conductive spring allows the force disc to contact portions of the conductors of the substrate, and the spring or sheath to contact portions of the conductors inside the pivoting hole area, generating electrical outputs to a microcontroller.

22 Claims, 3 Drawing Sheets

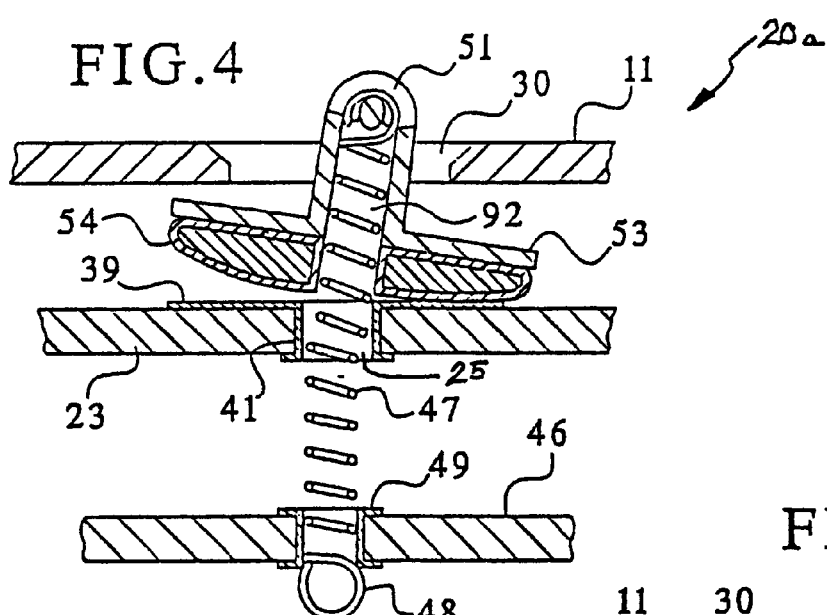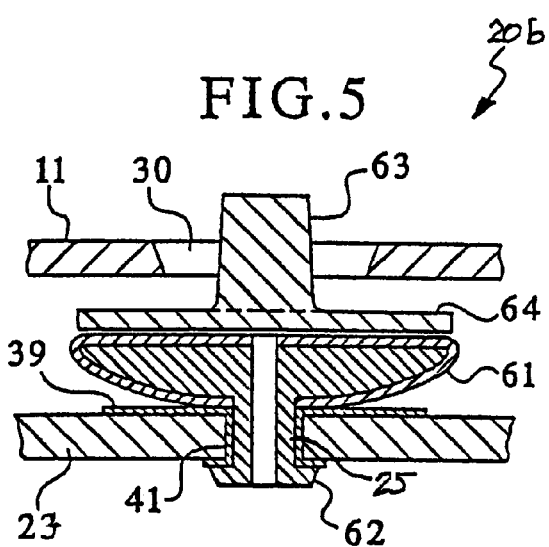

POINTING DEVICE HAVING SEGMENT RESISTOR SUBTRATE

BACKGROUND OF THE INVENTION

This invention relates generally to pointing devices and, more particularly to a pointing device having a segment resistor substrate.

Pointing devices including joysticks are known in the art. Traditional joysticks have been used primarily as a gaming controller, although they have also been employed as general mouse replacement devices. In a typical application, the joystick pointing device is connected via cables to a microcontroller of a computer with a display and a keyboard. The traditional joystick has many moving parts, and the size of the mechanism therein prohibits its use in many applications, including remote controls, keyboards, and notebooks. On the other hand, joysticks have the advantages of reliability and performance.

SUMMARY OF THE INVENTION

The present invention provides a pointing device having a segment resistor substrate surface with at least four segments of thick film on a printed circuit board, glass, paper, ceramic, or plastics, The board has a hole that can be plated on its inner surface and separated with laser, drilling, or routing. A spring fits through the hole at an approximately 90° angle. Normally, the spring does not make electrical contact with the board without application of external forces. The spring or a sheath formed around the spring is electrically conductive and the spring or sheath is biased with a voltage. When the spring is deflected by a user, it bends and either the spring or the sheath makes electrical contact with the conductor within the hole. The board has electrical contacts (digital) that are closed when an external force is applied. Signals so developed are supplied to a microcontroller either or both to wake up the microcontroller and inform the microcontroller regarding the direction and speed of the movement caused by the external force. Because a digital contact is used, there is no long analog-to-digital conversion time. The equation is $(1.1) \times (\text{resistance maximum}) \times (\text{Capacitance}) = \text{maximum conversion time}$, which is needed by analog only joysticks or other pointing devices. The use of only digital input leads eliminates the conversion delay time and facilitates rapid movement, causing the joystick to have very quick response to the user's initial movements of the joystick. The speed is determined, and only limited, by the speed of the microcontroller wakeup routine and the time to send the message to the receiver.

Under prolonged deflection of the spring/sheath, a force disc coupled to the spring/sheath makes or increases an electrical contact that produces data received by an is analog/digital signal speed/direction interpreter. The microcontroller converts this data with an earlier contact data, and determines the speeds and directions resulting in possible multiple speeds and multiple directions. The possible directions include at least two to an infinite number of directions, while the possible speeds also include at least two to an infinite number of speeds. The larger the displacement of the force disc as a result of the deflection of the spring/sheath, the further distance from the hole the force disc makes contact with the analog/digital circuitry. The further contact causes a variable signal that is a result of angular displacement of the spring induced by the joystick. The hole in the substrate serves as a pivoting area for pivoting the force disc through the spring.

Upon releasing the spring and joystick of all external forces by the user, the spring moves back to its normally biased position that does not make contact with the initial digital contacts. Likewise, the force disc coupled to the spring also moves back to its initial unloaded, neutral state. In this initial state, the force disc may or may not make contact with the digital/analog output section. If the force disc makes such a contact in the neutral state, the microcontroller ignores this information by zeroing out this condition. The force disc may be electrically active and conductive, or may be a pressure transfer point for causing a variable closure on a membrane switch. In that case, the corresponding increase in force on the force disc either increases the surface area of contact for a change in resistance, or changes the absolute point of contact on the analog/digital contact, thereby changing the point of the voltage potential. This changes the analog voltage. The software in the microcontroller interprets the data relating to this change and directs an output to a relevant receiver that can be connected by a wire or similar structural members.

One aspect of the present invention is a pointing device which comprises a substrate formed with a hole defined by a fixed pivoting area and a surface being coated 360 degrees radiating from around a center with electrically resistive and conductive material. The surface comprises at least four resistive angularly radiating tracts that provide a patterned geometry covering the entire active surface with a resulting linear resistance. An electrically conductive force disc makes electrical contact on the surface of the substrate at various positions. A pivoting mechanism has a flexible pivoting portion extending through the hole of the substrate wherein the force disc is attached to the pivoting mechanism above the pivoting area. The pivoting mechanism has an undeflected position and is movable to a deflected position by flexibly pivoting about the pivoting area wherein the pivoting mechanism causes the force disc to change electrical contact position with the electrically conductive/resistive material on the surface of the substrate to cause a corresponding change in signal output when the electrically conductive disc changes electrical contact position. Because the amount of resistive material deposited provides a linear correlation between the resistance and the distance extending radially from the center, the present invention allows for linear reading of position an speed as a function of distance from the center.

BRIEF DESCRIPTION OF THE DRAWINGS

FIG. 4 is a cross-sectional view illustrating another embodiment of the pointing device of the present invention.

FIG. 5 is a cross-sectional view illustrating another embodiment of the pointing device of the present invention.

DESCRIPTION OF THE PREFERRED EMBODIMENT

Figure 1:
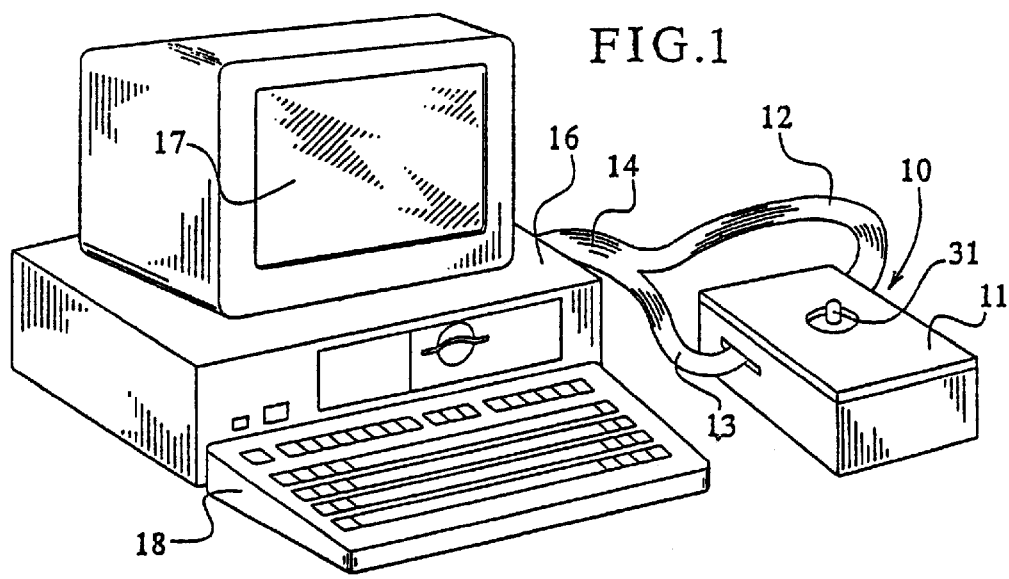
FIG. 1 is a perspective view illustrating a pointing device of the present invention connected to a computer system.

Referring to FIG. 1, a pointing device is shown contained in a container or box 10 having a top wall or cover 11. Although FIG. 1 shows a joystick pointing device, the present invention is not limited to joysticks. A pair of cables 12, 13 are coupled to the container 10 and extend from the container 10 to a junction at which the cable 12, 13 join together in a cable 14 that is connected to a microcontroller 16. The microcontroller 16 is associated with a monitor 17 and a keyboard 18.

Figure 2:
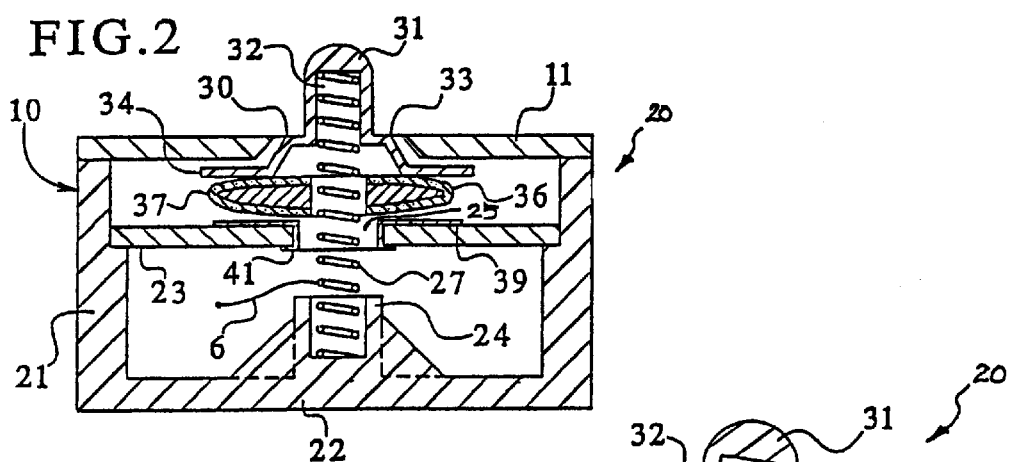
FIG. 2 is a cross-sectional view illustrating an embodiment of the pointing device of the present invention in a neutral position.

Referring to FIG. 2, the pointing device 20 is disposed inside the container 10 in a neutral position and surrounded by the top wall 11, side walls 21, and bottom 22. The container 10 may be made of a nonconductive material. The pointing device 20 includes a substrate or printed circuit board 23 that is disposed between the top wall 11 and bottom 22 and extend across the interior of the container 10. The substrate 23 includes a hole or opening 25, desirably in a central region. The bottom 22 includes an inner boss 24 that is generally aligned with the hole 25 of the substrate 23. The top wall 11 includes an opening 30 that is generally aligned with the bottom boss 24 and the opening 25. The board 23 includes electrically conductive paths 39 formed thereon and conductive paths 41 formed on the inner surface of the opening 25 of the board 23.

A spring 27 extends from a cavity in the boss 24 through the hole 25 and through the opening 30 of the top wall. 11 to a joystick 31. An electrical voltage is applied to the spring 27 by a conductor 6 connected to the spring 27 to produce an energizing voltage therein. The stick 31 has a cavity 32 for receiving the upper end of the spring 27. The stick 31 has a downwardly extending, generally conical portion 33 that joins a flat portion 34. The flat portion 34 engages a force disc 36 that is coupled to the spring 27 and disposed on top of the substrate or board 23. The force disc 36 is electrically conductive at least at the outer surface 37. The force disc 36 may be made of rubber with a low conductive surface for engaging the printed circuit paths 39 on the printed circuit board 23 when the spring 27 is deflected from its central position. The interior of the force disc 36 may be hollow or filled with a suitable filler such as plastic 38 (see FIG. 3).

In operation, when the stick 31 of FIG. 2 is moved, the spring 27 is deflected. The deflection causes the spring 27 to engage the surface of the conductors 41 formed in the opening 25 in the printed circuit board 23. The deflection also causes the force disc 36 to engage the printed circuit paths 39 on the board 23, as best seen in the illustrated deflected mode in FIG. 3.

Figure 3:
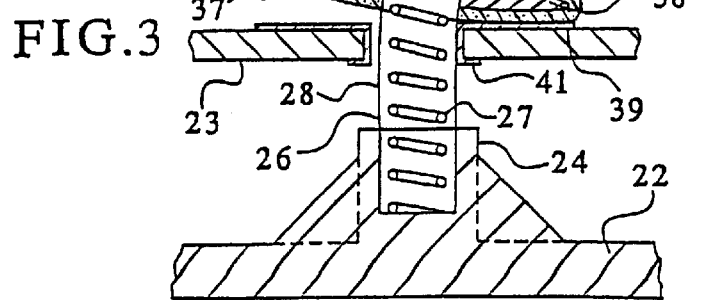
FIG. 3 is a cross-sectional view illustrating the pointing device of FIG. 2 in a deflected mode.

FIG. 3 illustrates a deflected mode of the pointing device 20 in which the joystick 31 is deflected from the neutral position. The spring 27 is electrically connected to a conductive sheath 28 which makes electrical contact with conductors 41 in the opening 25 of the substrate 23 when the stick 31 is deflected. In this deflected mode, the outer conductive surface 37 of the force disc 36 engages the printed circuit conductors 39 and the sheath 28.

Referring to FIG. 4, another embodiment of the pointing device 20a comprises a spring 47 that is mounted at its lower end 48 by a sleeve 49 provided through a bottom plate 46 inside the container 10. The upper end of the spring 47 is received into a hollow interior 92 of a stick 51. The stick 51 is attached to a bottom plate 53 that engages a force disc 54. In operation, when the stick 51 is moved, the force disc 54 will engage the conductive paths 39 on the printed circuit board 23 and the spring 47 will engage the conductive paths 41 on the inside of the opening 25 of the printed circuit board 23. The operation of this embodiment shown in FIG. 4 is similar to the operation of the embodiment of FIGS. 2–3, even though the two embodiments are structurally different.

FIG. 5 shows yet another embodiment of the pointing device 20b which comprises a force disc 61 that is made of a flexible material such as rubber. The force disc 61 has a portion that extends through the opening 25 of the printed circuit board 23 and terminates at its lower end in an enlarged portion 62 to engage the substrate 23 behind the conductive surface. A stick 63 extends from above the top wall 11 through the opening 30 of the top cover 11 to a lower flat portion 64. The lower flat portion 64 of the stick 63 engages the force disc 61 for moving the force disc 61 to engage the circuit paths 39 on the printed circuit board 23. Because the flexible force disc 61 deforms under a deflective loading to shift the contact with the substrate 23, no spring is needed in this embodiment.

Figure 6:
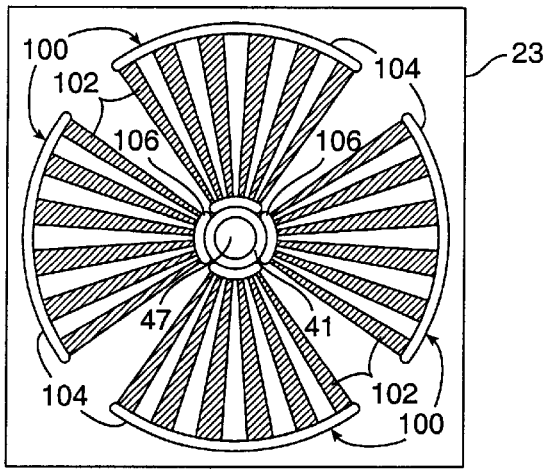
FIG. 6 is a top plan view illustrating an embodiment of the printed circuit board of the pointing device of the present invention.
Figure 7:
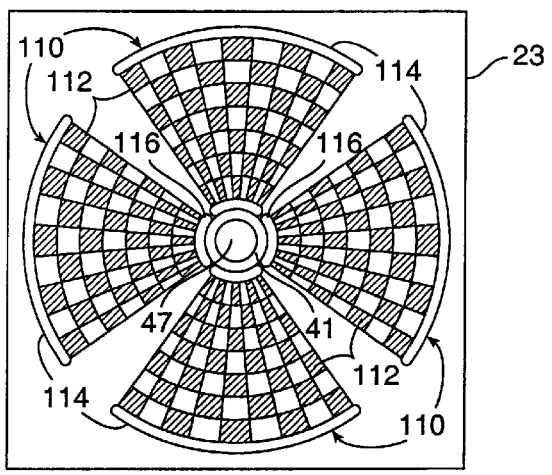
FIG. 7 is a top plan view illustrating another embodiment of the printed circuit board of the pointing device of the present invention.
Figure 8:
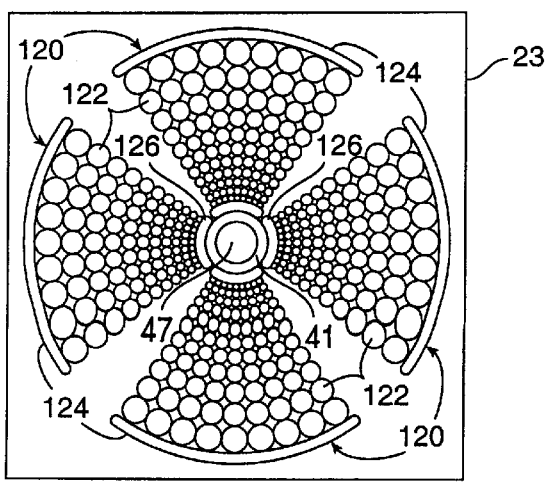
FIG. 8 is a top plan view illustrating yet another embodiment of the printed circuit board of the pointing device of the present invention.

The printed circuit board 23 may have several different configurations. Three examples are shown in FIGS. 6–8. Referring to FIG. 6, the circuit board 23 comprises four substantially equally sized and spaced segments 100. Each segment 100 has a plurality of radially extending thick film strips 102 that are circumferentially spaced from each other. This pattern is different from the previously known solid films covering the entire segments 100. The ends of the strips 102 are connected by conductors 104, 106 that extend at right angles to the strips 102 and make electrical contacts therewith. The spring 47 when deflected engages the conductors 41 on the inside of the opening 25 and the force disc 54 engages the printed circuit board 23.

FIG. 7 shows another embodiment of the printed circuit board 23, which comprises four substantially equally sized and spaced segments 110. Each segment 110 has a plurality of substantially rectangular thick film blocks 112 that are spaced from each other and connected via the diagonals. The size of the blocks 112 varies, increasing from the innermost group to the outermost group. The outermost and innermost groups of blocks 112 are connected respectively by conductors 114, 116 that make electrical contacts therewith. The spring 47 when deflected engages the conductors 41 on the inside of the opening 25 and the force disc 54 engages the printed circuit board 23.

Referring to FIG. 8, the circuit board 23 differs from that of FIG. 7 in that, instead of the substantially rectangular blocks 112, each segment 120 has a plurality of substantially circular thick film pieces 122. The pieces 122 are spaced from each other and connected tangentially with each other. The size of the pieces 122 varies, increasing from the innermost group to the outermost group. The outermost and innermost groups of pieces 122 are connected respectively by conductors 124, 126 that make electrical contacts therewith. The spring 47 when deflected engages the conductors 41 on the inside of the opening 25 and the force disc 54 engages the printed circuit board 23. By altering the amount of resistive material in a geometric manner, the resistive properties of the circuit board 23 are varied and the potential far circulating currents via parallel paths is reduced. Because the amount of resistive material deposited provides a linear correlation between the resistance and the distance extending radially from the center, the present invention allows for linear reading of position and speed.

It is understood that, although the embodiments shown have four segments, more or fewer segments are possible.

What is claimed is:

1. A pointing device comprising:

a substrate formed with a hole defined by a fixed pivoting area and a surface of the substrate being coated 360 degrees radiating from around a center on the surface of the substrate with electrically resistive and conductive material, the surface comprising at least four resistive angularly radiating tracts that provide a patterned geometry covering substantially the entire surface of the substrate to provide the surface of the substrate with a linear resistance, the resistive angularly radiating tracts each covering a portion of the surface of the substrate radiating from the center thereof and defined by an angle around the center thereof;

an electrically conductive force disc that makes electrical contact on the surface of the substrate at various positions; and a pivoting mechanism having a flexible pivoting portion extending through the hole of the substrate wherein the force disc is attached to the pivoting mechanism above the pivoting area and further wherein the pivoting mechanism has an undeflected position and is movable to a deflected position by flexibly pivoting about the pivoting area wherein the pivoting mechanism causes the force disc to change electrical contact position with the electrically conductive and resistive materials on the surface of the substrate to cause a corresponding change in signal output generated by electrical contact between the force disc and the surface of the substrate when the electrically conductive disc changes electrical contact position.

2. The pointing device of claim 1, wherein the pivoting mechanism is electrically conductive.

3. The pointing device of claim 1, wherein the force disc faces the surface of the substrate.

4. The pointing device of claim 1, wherein a voltage source is connected to the pivoting mechanism through a conductor.

5. The pointing device of claim 1, wherein the pivoting mechanism comprises a spring.

6. The pointing device of claim 5, further comprising a housing which supports the substrate and one end of the spring.

7. The pointing device of claim 5, wherein the pivoting mechanism further comprises an electrically conducting sheath disposed around the spring.

8. The pointing device of claim 5, further comprising a housing which supports the substrate and substantially affixes an end portion of the spring behind the surface of the substrate.

9. The pointing device of claim 5, wherein the force disc is coupled to the spring that is movable to selectively engage selected regions of the at least tour resistive angularly radiating tracks.

10. The pointing device of claim 9, wherein the spring extends through an opening provided in the force disc.

11. The pointing device of claim 1, wherein the fixed pivoting area comprises a pivot hole extending from the surface of the substrate through the substrate.

12. The pointing device of claim 11, wherein the force disc comprises a flexible material.

13. The pointing device of claim 12, wherein the pivoting mechanism comprises a portion of the flexible force disc extending through the pivot hole and being substantially fixed behind the surface of the substrate.

14. The pointing device of claim 12, wherein the flexible material is rubber.

15. The pointing device of claim 1, wherein the force disc is operable by a joystick having a portion bearing on the force disc toward the substrate.

16. The pointing device of claim 1, wherein each of the at least four resistive angularly radiating tracks includes a plurality of spaced thick film pieces.

17. The pointing device of claim 16, wherein the plurality of spaced thick film pieces include radially extending strips.

18. The pointing device of claim 16, wherein the plurality of spaced thick film pieces include substantially rectangular blocks connected to each other via diagonals.

19. The pointing device of claim 16, wherein the plurality of spaced thick film pieces include substantially circular pieces connected to each other tangentially.

20. The pointing device of claim 16, further comprising an outer conductor disposed at an outermost edge of each of the resistive angularly radiating tracks and making electrical contact with the thick film pieces at the outermost edge and an inner conductor disposed at an innermost edge of each of the resistive angularly radiating tracks and making electrical contact with the thick film pieces at the innermost edge.

21. The pointing device of claim 1, wherein the at least four resistive angularly radiating tracks are equally sized and spaced around the hole.

22. The pointing device of claim 1, wherein the pivoting mechanism permits the force disc to move in any direction in 360 degrees round the center of the surface of the substrate to make electrically contact on the surface of the substrate.

* * * * *